United States Patent [19]

Varga

[11] Patent Number: 4,595,345
[45] Date of Patent: Jun. 17, 1986

[54] GAS COMPRESSOR OR BLOWER

[76] Inventor: John M. J. Varga, 2 Lawrence Rd., Skircoat Green, Halifax, West Yorkshire, United Kingdom

[21] Appl. No.: 673,501

[22] Filed: Nov. 20, 1984

Related U.S. Application Data

[60] Division of Ser. No. 448,414, Dec. 19, 1982, Pat. No. 4,499,814, which is a continuation of Ser. No. 112,116, Jan. 14, 1980, abandoned.

[30] Foreign Application Priority Data

Jan. 15, 1979 [GB] United Kingdom ............... 7901415

[51] Int. Cl.$^4$ ............................ F04B 7/06; F04B 34/10
[52] U.S. Cl. ........................................ 417/500; 92/169; 417/254
[58] Field of Search ...... 123/193 C, 193 CP, DIG. 1, 123/DIG. 6, DIG. 7; 92/169; 29/156.4 WL, 156.4 R; 416/134, 136, 139; 417/500, 254

[56] References Cited

U.S. PATENT DOCUMENTS

| 813,536 | 2/1906 | Thier | 123/193 C |
|---|---|---|---|
| 2,491,630 | 12/1949 | Voorhies | 29/156.4 R |
| 2,863,634 | 12/1958 | Chamberlain et al. | 415/134 X |
| 4,499,814 | 2/1985 | Varga | 92/169 |

FOREIGN PATENT DOCUMENTS

869908  6/1961  United Kingdom ............... 415/136

Primary Examiner—Leonard E. Smith
Attorney, Agent, or Firm—Pasquale A. Razzano

[57] ABSTRACT

A gas compressor or blower having a piston rod 88 carrying pistons 162, 173 working within cylinders 161, 172. The piston shaft is driven to rotate and reciprocate so that each piston rotates and reciprocates in its respective cylinder, ports being provided to allow induction and after compression exhaust the gas from each cylinder during such movement. Each cylinder comprises a plurality of circumferentially adjoining sealing segments (such as 203, 204) supported from bridge pieces (such as 104, 106) by adjusting bolts (such as 114, 123). Each segment can be set independently of the others relative to support plates (101, 103) so that the clearance between the inner surface of the segment and the confronting surface of the piston is sufficiently low to limit axial leakage between the piston surface and the segment surface without the need for any piston ring and to limit leakage to or from respective ports form in certain of the segments both axially and circumferentially of the piston.

14 Claims, 19 Drawing Figures

GAS COMPRESSOR OR BLOWER

This application is a division of U.S. patent application Ser. No. 448,414 filed Dec. 19, 1982, now U.S. Pat. No. 4,499,814, which application is a continuation of U.S. patent application Ser. No. 112,116 filed Jan. 14, 1980 (now abandoned).

This invention relates to gas compressors or blowers. There are many types of compressor available which operate on the principle of inducing gas into a cylinder, compressing the gas and exhausting the compressed gas from the cylinder. Generally, at least two compression spaces (which may be at opposite ends of a single cylinder) are used and the induction and exhaust operations are controlled by valves operating in timed sequence with a piston or pistons reciprocating or reciprocating and rotating in the cylinder or cylinders. By using valves and having one or more piston rings around the circumference of the piston, leakage of gas from high to low pressure areas can be avoided or at least reduced to an acceptable level. The use of piston rings does, however, lead to wear and it would be advantageous if these could be avoided.

It has been proposed to eliminate from a compressor the conventional valves and mechanical drives required for operating the valves, and to effect the valving operations merely by the alternate communication and non-communication of ports in the piston and in the cylinder. The present invention seeks to solve the problems of sealing that are associated with these arrangements, without the use of piston rings.

According to the present invention a gas compressor or blower comprises a cylinder defining at least one compression chamber, a piston reciprocable in the cylinder to compress gas in said chamber, and ports allowing alternate induction of gas into said chamber and after compression, exhaust of gas from said chamber as said piston reciprocates characterised in that said cylinder comprises a plurality of circumferentially adjoining sealing segments, each segment having an inner surface region of arcuate cross-section, the inner surface regions of all the segments combining to form a substantially cylindrical surface of given axial length which the outer surface of the piston confronts during reciprocation, segments having been adjusted relative to support means and secured on said support means so that the clearance between the inner surface region of each segment and the confronting surface of the piston is sufficiently low to limit axial leakage between the piston surface and that surface region without the need for any piston ring.

In a double-acting compressor, ports will be provided for the compression chambers at each axial end of the piston, and the small clearance between the piston and cylinder will limit leakage between the two chambers to an acceptable level, without the use of piston rings.

Preferably the clearances between the sealing segments and the confronting surfaces are such that passage of gas is restrained by the limited clearances alone. Alternatively the sealing segments may incorporate oil supply means for creating a high pressure barrier of oil between the sealing segments and the confronting surfaces. It is desirable if the sealing can be effected without the use of oil, as the compressed gas is then received in an uncontaminated state.

The actual degree of sealing which is effected will depend on the pressure difference between the regions, on the clearance between the sealing segments and the confronting surfaces and on the length of the potential leakage path. It is found that in low pressure compressors a clearance of about 0.026 mm is adequate to give sufficient sealing effect without the use of oil, whereas in high pressure compressors a clearance of no more than about 0.02 mm may be required. Preferably in any compressor required to operate without the use of oil for sealing purposes the clearance is in the range of from 0.008 to 0.026 mm, with a particularly preferred range of 0.015 to 0.019 mm. Greater clearances are possible when the invention is applied to a blower, which operates at much lower pressures, and here the clearances may be as high as 0.1 mm.

By using individually adjusted sealing segments to form the cylinder each segment may be mounted so that it can be accurately set at the required clearance from the confronting surface independently of the other sealing segments.

Desirably the inner surface region of each segment has an axial length at least equal to the full axial length swept by the piston during reciprocation and the axial length of the confronting surface of the piston is at least three times the stroke of the piston. In this way the area of confrontation is the area of the radially outer surface of the piston, which is substantially larger than in other compressors. As a result of this large area and small clearance heat transfer between the piston and cylinder is enhanced and these can be kept at substantially identical working temperatures. This feature is extremely important in maintaining the small clearances at the required levels as effects of relative expansion and contraction are predictable.

The invention is applicable to simple reciprocating compressors, or to compressors wherein a piston is rotatably and reciprocably mounted in a cylinder. Such a compressor is known which comprises cylinder means; piston means rotatably and reciprocably mounted in the cylinder means; ports spaced around the circumference of the piston means for cooperating with ports spaced around the circumference of the cylinder means to admit gas into and exhaust gas from at least one chamber lying to one side of the piston shaft to which the piston means is secured, the piston shaft passing through seals at the axial ends of the cylinder means; and means for driving the piston shaft to rotate and reciprocate relative to the cylinder means, the arrangement of ports being such that as the piston rotates and reciprocates gas is induced into the chamber, is compressed in the chamber and then exhausted from the chamber.

In a compressor of this type preferably each of the ports on a first one of the piston and cylinder means has associated sealing means forming a continuous barrier around the periphery of the associated port and confronting the second one of the piston and cylinder means with a clearance between the sealing means and the confronting surface sufficiently low to limit leakage to or from the respective port both axially and circumferentially of the piston when that port is fully confronted by the piston.

Preferably such compressor includes sealing means on said first one of said piston and cylinder means and confronting the surface of said second one of those means, the sealing means forming a continuous barrier around the circumference of the piston with the clearance between the sealing means and the confronting surface being sufficiently low to limit axial leakage between the piston and cylinder means. The clearance between each sealing means and the confronting surface is again from 0.008 to 0.1 mm, preferably from 0.015 to 0.019 mm.

The cylinder means then comprises two axially spaced end members, a plurality of sealing segments having inner surface regions constituting the sealing means, the segments extending between the end members and circumferentially adjoining one another to form a closed, substantially cylindrical inner surface, two of the segments each having an inlet port formed through its radial thickness and opening into its inner surface region, two other of the segments each having an outlet port formed through its radial thickness and opening into its inner surface region, and each segment being mounted on the end members so that it can be radially adjusted independently of the other segments.

Each sealing segment may have an internal radius of curvature different from (preferably greater than) the external radius of curvature of the piston. If each segment then has an angular extent of no more than 70°, and the difference between the radii is not more than 0.05%, it may be adjustably mounted at or near to each of four corners to be set so that the spacing between the centre of the segment and the piston differs from that between the edges of the segment and the piston by only a negligible figure. Within this arrangement the number of segments used is not critical; a preferred number is six. In the context of blowers, where the clearances are somewhat less critical it may be possible to use segments each having an angular extent of up to 90°. Preferably a plurality of bridge pieces extend axially between and are fixedly secured to the end members, the sealing segments lie radially inwardly of the bridge pieces and are adjustably supported from the bridge pieces. Other support arrangements for the segments are, of course, possible.

In an alternative embodiment there is provided a continuous cylinder and each sealing means is mounted adjustably on the cylinder to protrude inwardly from the radially inner surface thereof, preferably by a series of bolts capable of cooperating with the sealing means to move this radially inwardly and outwardly of the cylinder and a series of locking members bearing on the sealing means to move this only radially inwardly of the cylinder, the bolts and the locking means being alternately arranged circumferentially of the cylinder. The "Push-pull" effect which this arrangement permits allows the required settings to be obtained in a relatively simple manner. The sealing means may be distinct, port-defining elements and/or a series of strips disposed to effect sealing in the required regions.

In order that the invention may be better understood specific embodiments thereof will now be described in more detail, by way of example only, with reference to the accompanying drawings in which.

Figure 1:
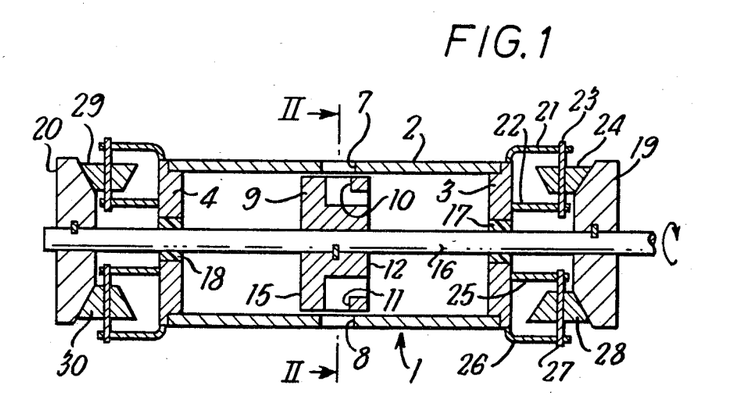
FIG. 1 shows schematically a cross-section through a single-stage air compressor in which the invention may be embodied.
Figure 2:
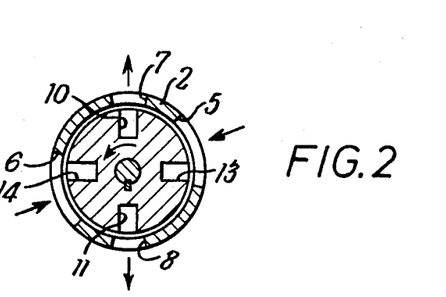
FIG. 2 is a cross-section on the line II—II of FIG. 1.
Figure 3:
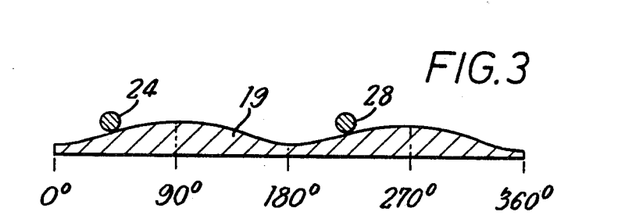
FIG. 3 shows the development of a cam surface used in the apparatus of FIG. 1.

Referring now to FIGS. 1 to 3 the apparatus (which is only schematic) comprises a cylinder 1 having a cylinder barrel 2 and axial end plates 3 and 4. Formed in the wall of the barrel are two diametrically opposed intake ports 5 and 6 and two diametrically opposed exhaust ports 7 and 8.

Fittedd within the cylinder barrel is a piston 9, there being a small clearance between the piston and the barrel. The piston is formed with two diametrically opposed valving ports 10, 11 opening into one surface 12 of the piston, and a further two diametrically opposed valving ports 13, 14 opening into the other surface 15 of the piston. The centre lines of the valving ports lie at 90° to the centre lines of adjacent valving ports.

The piston 9 is keyed to rotate with a piston rod or shaft 16 which is supported by journal or rolling bearings 17 and 18 in the end plates 3 and 4. At each end of the piston rod there is keyed thereto a contoured end cam 19 and 20 respectively, the developed contour of each cam being shown in FIG. 3. It will be seen that each cam has two diametrically opposed peaks and two diametrically opposed valleys, shown as spaced by 90° from the peaks. The cams are mounted on the piston rod so that one is turned through 90° relative to the other i.e. the peaks of one cam are axially aligned with the valleys of the other.

Secured to the end plate 3 of the cylinder are arms 21, 22 supporting a pin 23 about which a roller 24 is journalled for rotation, and arms 25, 26 supporting a pin 27 about which a roller 28 is journalled for rotation. The two rollers 24, 28 run in contact with the cam 19. A similar arrangement is provided at the opposite end of the cylinder, with rollers 29, 30 running in contact with cam 20.

Operation of the apparatus will readily be understood. As piston rod 16 is rotated by a drive means (not shown) the reaction between cams 19 and 20 and their respective rollers will cause the piston rod and piston to reciprocate in the cylinder. The valving ports 10 and 11 will, when the piston starts to move from its right hand limit of its travel uncover the intake ports 5 and 6 and gas will be induced into the cylinder to the right of the piston, induction continuing as the piston moves to the left until the valving ports 10 and 11 have moved away from the intake ports. Also, as the piston moves to the left, air already induced to the left of the piston on the preceding rightward movement of the piston is compressed, until further rotation moves valving ports 13 and 14 to uncover exhaust ports 7 and 8. The compressed air is thus released. It will be understood that this operation occurs twice during each revolution of the piston, in alternation with similar induction to the left of, and compression to the right of, the piston, the complete cycle during a 360° rotation of the piston consisting of two inductions and two compressions to each side of the piston.

The apparatus shown in FIGS. 1 to 3 has been described to show the principle of operation of a compressor in which the invention may be incorporated, and a preferred embodiment of a two-stage air compressor will now be described in detail.

Figure 4:
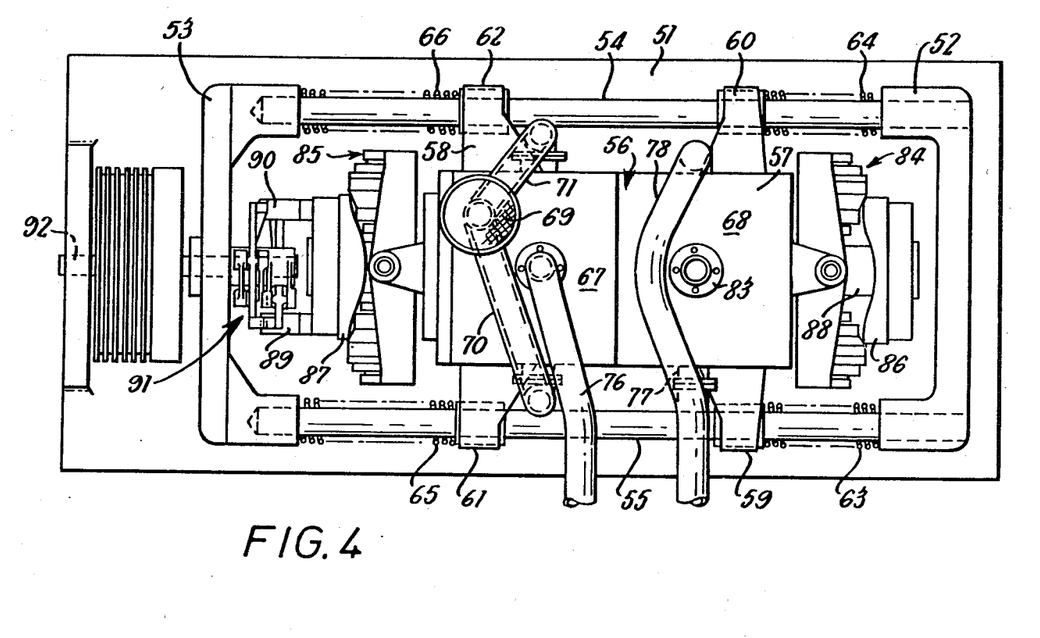
FIG. 4 is a schematic plan view of a two-stage air compressor according to the invention.

FIG. 4 shows such a compressor in general outline. The apparatus is mounted on a base 51 having two upstanding sections 52, 53 between which extend two circular cylindrical guide rods 54, 55. Mounted on the base is a cylinder assembly 56 having two mounting elements 57, 58 each with arms carrying sleeves 59, 60 and 61, 62 respectively which are slidable on the guide rods 54, 55. Compression springs 63 to 66 are mounted between the sleeves and the upstanding sections 52, 53. The cylinder assembly 56 comprises two stages, a low pressure cylinder 67 and a high pressure cylinder 68. An air intake 69 is mounted on the low pressure cylinder and flexible ducts 70, 71 lead to intake ports into low pressure cylinder 67. Exhaust ports from this cylinder communicate with a flexible duct 76 which is connected to an intercooler (not shown). From the intercooler the first stage compressed air passes through flexible ducts 77, 78 to intake ports into the high pressure cylinder 68. From exhaust ports in the high pressure cylinder compressed air at the required pressure is led to an outlet 83.

Mounted at each end of the cylinder assembly 56 is a roller assembly 84, 85, constituting a cam follower arrangement which co-operates with cams 86, 87 mounted at opposite ends of a piston shaft 88 passing through the cylinders and carrying two pistons, one within the low pressure cylinder and one within the high pressure cylinder.

The cam 87 has projections 89, 90 engaged by a drive transmission 91 driven from a shaft 92, the transmission being such as to apply a rotary drive to the shaft 88 while allowing reciprocation of the shaft. Such reciprocation occurs due to the co-operation of the cams and cam follower rollers. The cam and drive arrangements are described in detail in British Pat. No. 1,438,488 and U.S. Pat. No. Re29503, the entire contents of both of which are hereby incorporated by reference.

Figure 5:
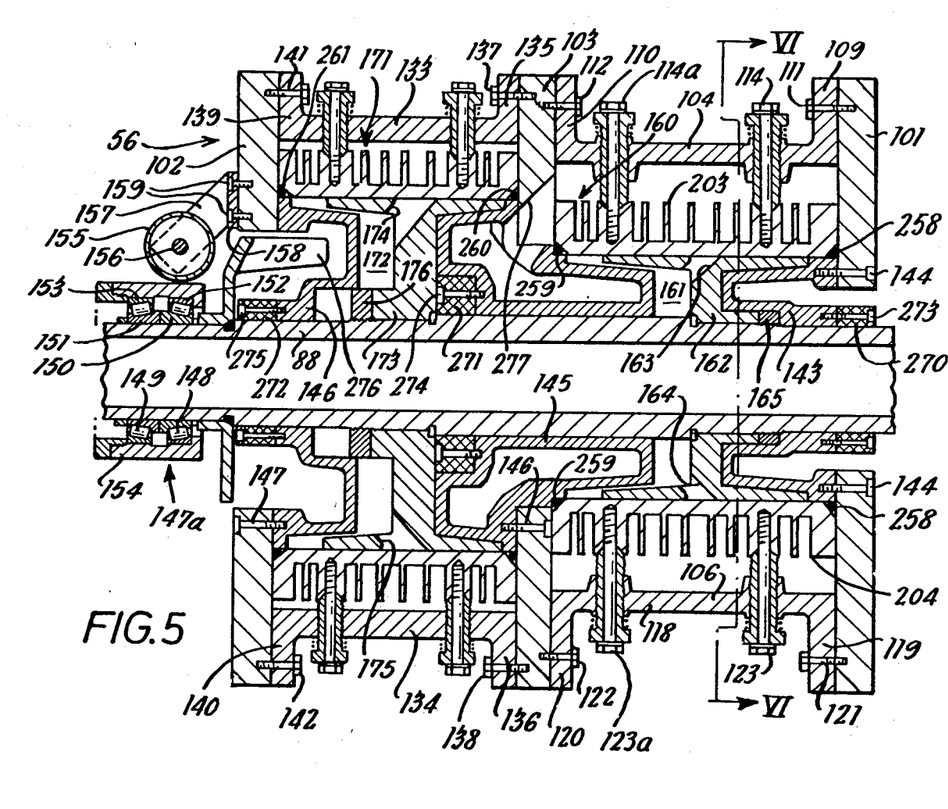
FIG. 5 is a longitudinal cross-section through part of the compressor of FIG. 4.
Figure 6:
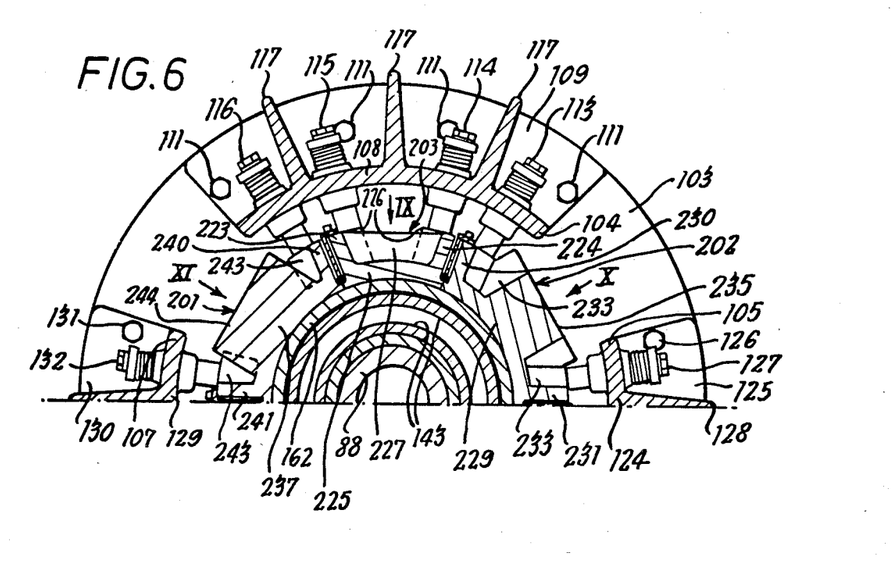
FIG. 6 is a cross-section on the line VI—VI of FIG. 5.

Referring now to FIG. 5 the cylinder assembly 56 comprises three annular plates, an end plate 101 for the high pressure cylinder, an end plate 102 for the low pressure pressure cylinder and a plate 103 between the high and low pressure cylinders. The plates 101 and 103 are secured together by four bridge pieces 104 to 107. The bridge pieces 104 and 106 are identical and each includes a body section in the form of a segment 108 of a cylinder subtending an arc of approximately 80° and having at each end an integral flange 109, 110. The flange 109 is secured to the end plate 101 by bolts 111 and the flange 110 is secured to the centre plate 103 by bolts 112. The body section 108 is provided towards each end thereof with four bores, each capable of receiving an adjusting bolt 113 to 116. All four such bolts at the end of the bridge piece adjacent to the end plate 101 are shown in FIG. 6; not all the corresponding bolts at that end of the bridge piece adjacent to centre plate 103 are shown in the drawings, but those that are carry the same one of reference numerals 113 to 116 with the suffix a. The body section 108 is provided with a series of radially outwardly extending cooling fins 117.

The bridge piece 106 is, as stated, identical to the bridge piece 104 and has a body section 118, flanges 119 and 120 secured by bolts 121 and 122 to the end plate 101 and centre plate 103 respectively, bores for receiving four adjusting bolts such as 123 adjacent to the end plate 101 and bores for receiving four adjusting bolts such as 123a adjacent to the centre plate 103.

The bridge piece 105 is similar to but of smaller angular extent than the bridge pieces 104, 106 and comprises a body section 124 subtending an angle of about 30° and having at one end a flange 125 secured by bolts 126 to the end wall 101, and at its other end a similar flange secured by bolts to the centre plate 103. Adjacent to the flange 125 the centre section is formed with bores for receiving two adjusting bolts such as 127, and corresponding bores and adjusting bolts are provided at the opposite end of the body section adjacent the other flange. The body section is formed with a single cooling fin 128. The bridge piece 107 is identical to the bridge piece 105, having a body section 129, flanges such as 130 secured by bolts such as 131 to the respective ones of the end and centre plates 101 and 103, and bores for receiving adjusting bolts such as 132. The bridge pieces 104 and 106 lie diametrically opposite one to the other, and similarly the bridge pieces 105 and 107 lie diametrically opposite one to the other. FIG. 6 shows only the upper half of the construction, it being understood that bridge piece construction in the lower half is symmetrical with that in the upper half along the centre plane.

The centre plate 103 and end plate 102 of the low pressure cylinder are secured together in a manner similar to those of the high pressure cylinder by a series of four bridge pieces corresponding in angular extent, spacing and construction to the bridge pieces 104 to 107. FIG. 5 shows two of these bridge pieces as 133 and 134 having respective flanges 135, 136 secured by bolts 137, 138 to the centre plate 103 and having respective flanges 139, 140 secured by bolts 141, 142 to the end plate 102.

A high pressure end bush 143 is secured by a series of bolts such as 144 to the high pressure end plate 101. A centre bush 145 is secured by bolts such as 146 to the centre plate 103, and a low pressure end bush 146 is secured by bolts such as 147 to the low pressure end plate 102. The piston shaft 88 extends through these three bushes. The shaft is supported by a bearing assembly shown as 147a at the low pressure cylinder end and by an identical bearing assembly (not shown) at the high pressure cylinder end. The bearing assembly 147a comprises oppositely directed series of roller bearings 148, 149 running between inner tracks 150, 151 secured to the piston shaft 88 and outer tracks 152, 153 secured to a carrier 154. The roller bearings thus allow rotation of the piston shaft 88 relative to the carrier 154. The carrier itself is supported by at least three rollers 155 equiangularly spaced around the piston shaft, each roller being supported by a shaft 156 journalled in bearings carried by two spaced support arms 157 extending from a mounting plate 158 secured by bolts 159 to the low pressure cylinder end plate 102. The rollers 155 allow reciprocation of the mounting 154 and thus of the piston shaft 88 relative to the cylinder assembly. Each end of the piston shaft 88 carries a cam as described with reference to FIG. 4 and one end of the piston shaft is connected with the drive arrangement as also shown in FIG. 4.

The high pressure end bush 143 and centre bush 145 combine with an assembly of sealing segments shown generally as 160 and to be described in more detail later, to form a high pressure cylinder 161. A high pressure piston 162 is secured to the piston shaft 88 by a nut 165 and is received within the high pressure cylinder 161. Two diametrically opposed ports 163, 164 are formed through the high pressure piston to communicate the outer surface of the piston with the chamber formed within the cylinder to the left of the piston as seen in FIG. 5. Two further ports, with their centre lines spaced at 90° from the centre lines of the ports 163 and 164 are also formed through the high pressure piston to connect the outer circumference of this with the chamber formed to the right-hand side of the piston as shown in FIG. 5.

The centre bush 145 and low pressure end bush 146 combine with an assembly 171 of sealing segments (again to be described later) to form a low pressure cylinder 172. A low pressure piston 173 is secured to the piston shaft by a nut 176 and received within the low pressure cylinder. The low pressure piston has diametrically opposed ports 174, 175 connecting the chamber to the left-hand side of the piston with the outer circumference of the piston, and has two further similar ports with their centres spaced at 90° from those of the ports 174, 175, communicating between the chamber to the right of the low pressure piston and the outer circumference thereof.

The assembly 160 of sealing segments which forms the high pressure cylinder comprises (FIG. 6) a first inlet port segment 201, a second inlet port segment diametrically opposite to the segment 201, a first outlet port segment 202, a second outlet port segment diametrically opposite to the segment 202, a first blank segment 203 and a second blank segment 204 diametrically opposite to the segment 203. The inlet port segments are substantially identical in their construction and mounting and only segment 201 will be described in detail. The two outlet port segments are substantially identical in their construction and mounting and only the segment 202 will be described in detail. Similarly, the two blank segments 203 and 204 are substantially identical in their structure and mounting and only the segment 203 will be described in detail.

Each sealing segment is adjustably supported adjacent to each of its corners by four bolt assemblies from the adjacent bridge pieces. Thus, the inlet port segment 201 is supported at one end by bolt assemblies 116 and 132 from bridge pieces 104 and 107 and by a pair of similar bolt assemblies at the opposite end of the segment. The outlet port segment 202 is supported by bolt assemblies 113 and 127 from bridge pieces 104 and 105 and by similar bolt assemblies at the opposite end of the segment. The blank segment 203 is supported by bolt assemblies 114 and 115 from bridge piece 104 and by corresponding bolt assemblies such as 114a at the opposite end of the segment.

Figure 7:
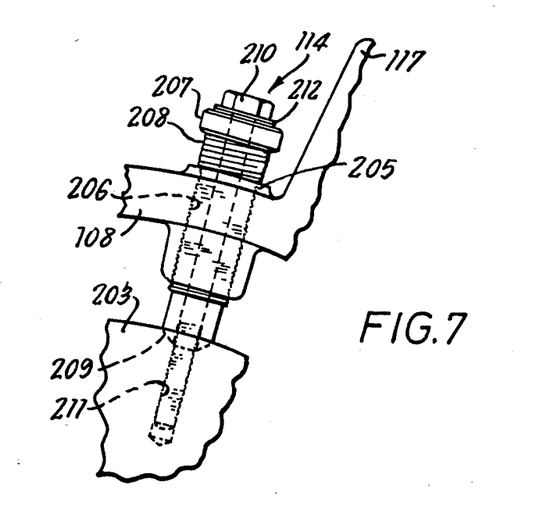
FIG. 7 is a partial cross-section through an adjusting bolt assembly.

Each bolt assembly is such that it may be used to adjust radially the respective corner of the segment and the actual construction is shown in FIG. 7. Each bolt assembly comprises a micrometer sleeve 205 which is externally threaded and which engages within an internally threaded hole 206 through the body section such as 108 of the respective bridge plate. The sleeve has a head 207 by which it may be rotated, and a compression spring 208 surrounds that part of the sleeve lying between the body section 108 and the head 207. The radially inner end 209 of the sleeve bears in an indentation on the outer surface of the respective segment 203. A bolt 210 extends freely through a bore in the micrometer sleeve 205 and its inner end engages in a tapped bore 211 in the segment. A spring washer 212 is provided between the head of the bolt and the head 207 of the sleeve, and acts to hold the inner end 209 of the sleeve hard against the body section 108. The spring 208 enables the micrometer sleeve 205 to be adjusted without error due to backlash on the threads. By adjustment of the micrometer sleeve and the bolt it will be seen that the radial position of the respective corner of the segment may be adjusted with respect to the respective bridge piece and thus with respect to the piston, the sleeve being locked in the adjusted position by tightening the bolt 210 to collapse completely the spring washer 212.

Figures 8, 18:
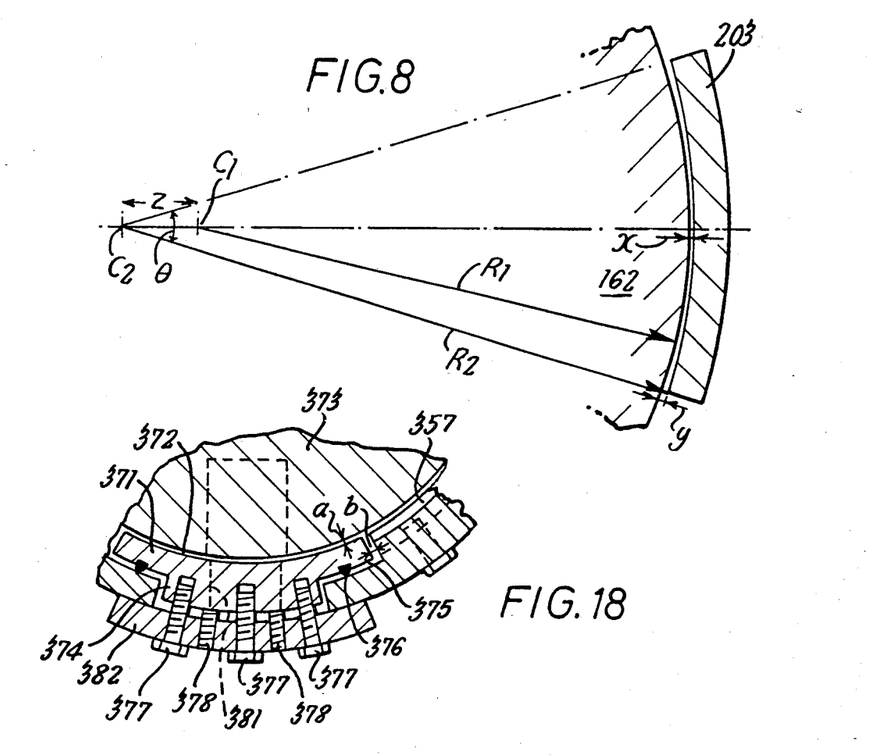
FIG. 8 is a diagrammatic view showing the relationship between a sealing element and a piston.
FIG. 18 shows an alternative method of mounting sealing elements.
Figure 9:
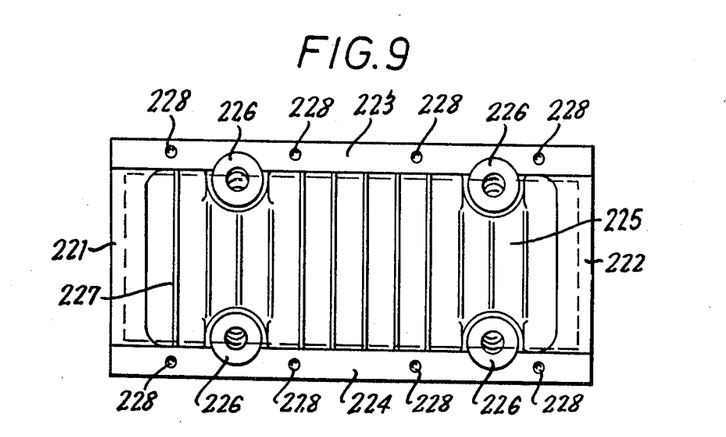
FIG. 9 is a view of a first form of sealing segment taken in the direction of arrow IX in FIG. 6.

It has already been stated that the sealing segments are of different angular extent, but FIG. 8 illustrates the principles involved in the setting of each one of the segments. This Figure shows schematically the piston 162 which has an outer surface of radius R1 and a segment 203 which has an inner surface of radius R2, greater than radius R1. The clearance between the segment and the piston thus varies around the piston circumference, from a minimum value of x at the centre of the segment to a maximum value of y at each end of the segment. Both distances may be adjusted by moving the segment towards or away from the piston to vary the distance z between the centres C1 and C2 from which radii R1 and R2 are drawn. If the angle $\theta$ subtended by the segment at its centre is no more than 70°, and if the percentage difference between the radii R1 and R2 is no more than 0.05%, then acceptable clearances can be obtained between the whole inner surface of the segment and outer surface of the piston by setting the distance x at the required minimum clearance. This setting is effected using the four adjusting bolts for the respective segment. It is of course possible to obtain a similar effect by using segments having inner surfaces of smaller radius than the radius of the piston surface, in which case the clearance of the segment centres will be greater than that of the extremities of the segments.

The individual segments are shown in more detail in FIGS. 9 to 15. The blank segment 203 (FIG. 9) and its diametrically opposite blank segment each comprise axial end walls 221, 222 and radially extending side walls 223, 224. The walls extend from a body section 225 having an inner surface of the required radius R2, as described with reference to FIG. 8. Bosses 226 with tapped bores for receiving the adjusting micrometer sleeves extend outwardly from the body section 225. The body is also formed with twelve parallel cooling fins such as 227 which extend between the side walls 223 and 224. The radially outer surfaces of the side walls 223 and 224 are each formed with a series of four tapped holes 228.

Figure 10:
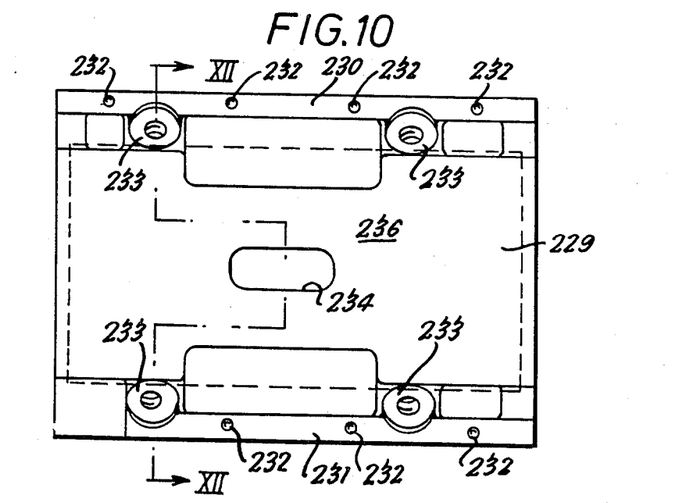
FIG. 10 is a view of a second form of sealing segment taken in the direction of arrow X in FIG. 6.
Figure 12:
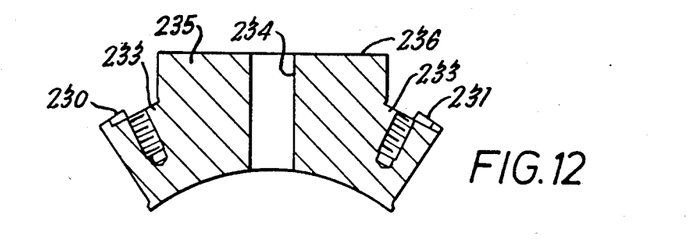
FIG. 12 is a cross-section on line XII—XII of FIG. 10.

The exhaust port segment 202 (FIGS. 10 and 12) and the diametrically opposite exhaust segment each comprise a body section 229 having an arcuate inner surface of radius R2, as described with reference to FIG. 8. Side walls 230 and 231 extend from the body section and have radially outer surfaces formed with tapped bores 232. Bosses 233 also extend from the body section and have tapped bores for receiving respective ones of the micrometer sleeves. The section has a through opening 234 by way of which compressed air may be exhausted from the cylinder 161, the opening terminating at its radially outer extremity in a projection 235 which has a flange surface 236 on which may be received and secured a flexible duct communicating with the exhaust port.

Figure 11:
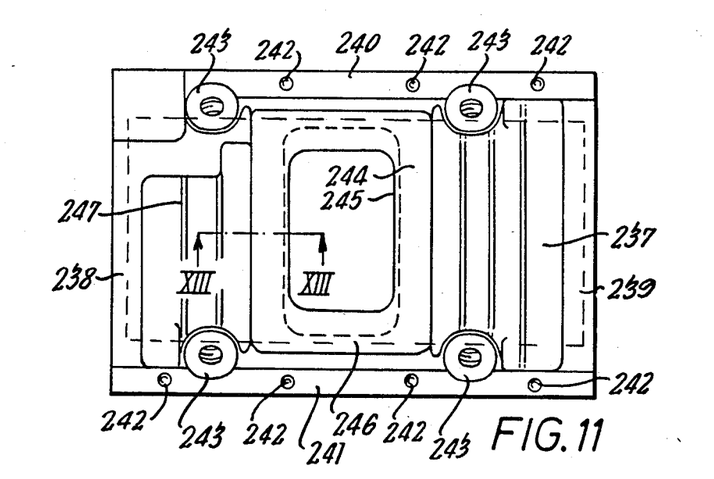
FIG. 11 is a view of a third form of sealing segment taken in the direction of arrow XI in FIG. 6.
Figure 13:
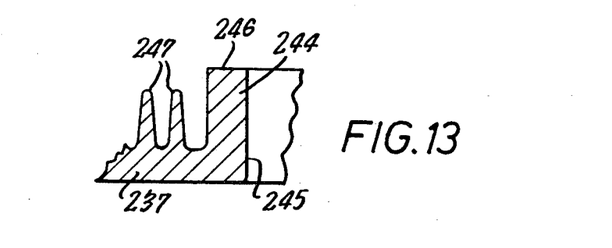
FIG. 13 is a cross-section on line XIII—XIII of FIG. 11.

The inlet port segment 201 (FIGS. 11 and 13) and its corresponding diametrically opposite segment each comprise a body section 237 from which extend axial end walls 238, 239 and side walls 240, 241. The radially outer surfaces of the side walls 240, 241 have tapped holes 242 therein. Bosses 243 also extend from the body section and have threaded bores for receiving the micrometer sleeves of the respective bolt assemblies. The segment has a radially extended part 244 through which is formed an opening 245 extending throughout the thickness of the segment and opening into the inner surface thereof. The section 244 terminates in a flange 246 to which a flexible duct may be secured to communicate with the inlet port 245. Cooling fins such as 247 are mounted on other parts of the surface of the body section.

Figure 14:
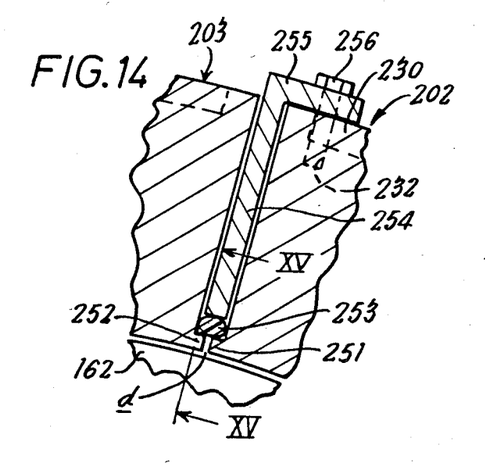
FIG. 14 is an enlarged partial cross-section through two adjacent sealing segments.

At its radially inner extremity each sealing segment is stepped along its side walls to form protruding lips such as 251, 252 (FIG. 14). The gap between these lips extends axially of the compressor and it should be kept to a minimum; if necessary a shim may be pinned into one or more of the gaps to reduce the clearance. In the space above the two lips there is received a sealing ring 253 to prevent air leakage between the respective segments, the sealing ring 253 between segments 202 and 203 (shown as an example) being compressed into position as shown in FIG. 14 by a strip 254 extending the full axial length of the segment and having a flange 255 for overlying the segment 202 and bolted to the side walls 230 thereof by bolts 256 engaging in the tapped holes 232.

Figure 15:
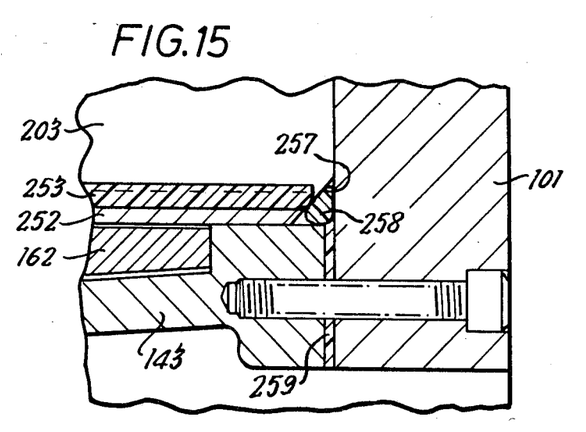
FIG. 15 is a fragmentary cross-section on line XV—XV of FIG. 12.

The radially inner part of each axial end of each of the segments is chamfered as shown at 257 in FIG. 15, and the sealing strip 253 extends beyond the chamfer. A further sealing ring 258 is received in the chamfered space and bears against the sealing strip 253, against the high pressure end plate 101 and against the end bush 143. A shim 259 is incorporated between the confronting surfaces of the end plate 101 and end bush 143 to ensure the required setting. A similar sealing arrangement is provided between the opposite axial ends of the segment, the centre bush 145 and the centre plate 103.

The low pressure cylinder is formed in a similar fashion to the high pressure cylinder that has been described. Thus, the low pressure cylinder is formed of six sealing segments each subtending the same angle as a corresponding, axially aligned one of the high pressure sealing segments. Each low pressure sealing segment is supported by adjustable bolt assemblies from the bridge pieces such as 133 and 134 in the same way as the high pressure sealing segments are supported from their associated bridge pieces. The detailed construction of the individual low pressure sealing segments is in each case similar to the construction of the axially aligned high pressure sealing segment, although the low pressure sealing segments are of lesser axial extent than the high pressure ones and are of greater diameter than the high pressure ones. The radially inner parts of the axial ends of the low pressure sealing segments are chamfered and sealing rings 260 and 261 are incorporated between these segments, the centre plate 103 and centre bush 145, and between the segments and the low pressure end plate 102 and end bush 146 respectively.

The sealing segments forming the high and low pressure cylinders are set by the adjusting bolts so that they each confront the respective piston with a very small clearance between the inner surface of the segment and the outer surface of the piston. The combined segments thus form a continuous barrier around the periphery of the piston to prevent leakage between the chambers lying to each side of the piston. In the case of the input and exhaust sealing segments this very small clearance between the segment and the piston also serves to form a barrier around the periphery of the respective port that opens into the inner surface of the segment. The maximum clearance between the segment and piston surfaces, i.e. the clearance y in FIG. 8 is desirably from 0.008 to 0.026 mm and is preferably between 0.015 and 0.019 mm. Clearances of these dimensions reduce air leakage between the chambers and into the ports to insignificant amounts.

The use of micrometer sleeves as described enables the required clearances to be set very accurately. Four such sleeves, positioned as described, allow each segment individually to be adjusted relative to the piston to set not only the clearance but also the angle of the segment to the piston axis. Small variations of concentricity in the apparatus may thus be compensated for. After setting the segments to the required clearances they are effectively locked in position by the bolts 210 collapsing the washers 212. However if it is required to prevent further adjustment by releasing the bolts 210 each segment may be positively secured in place before the apparatus leaves the factory, for example by pins inserted into the segments through the end plates 101, 102 and centre plate 103.

The set clearances must, of course, be maintained within close tolerances during operation of the apparatus, and this is assisted by two features of the apparatus as described. The first of these is that in each cylinder the axial length of each segment is slightly greater than the full axial length of the piston during reciprocation so that at all times the full length of the piston is confronted by the segments. Additionally the axial length of the confronting surface of the piston is at least four times the stroke of the piston, in the example shown the ratio for the high pressure cylinder is 5:1 and for the low pressure cylinder is 4:1. By providing such a large area of piston surface so closely spaced to the segments heat transfer between the piston and the segments is enhanced and they can be kept at substantially identical working temperature. By choosing materials with similar coefficients of expansion, therefore, the originally set clearances remain substantially constant over a wide range of operating temperatures.

The second feature that asists in the maintenance of close tolerances is the positioning of the four adjusting bolt assemblies that mount each segment on the associated bridge pieces. During operation, each segment is subjected to a radially outward force as gas is compressed in the cylinder and this force may result in deflection of the segment about its support points in a manner similar to the deflection of a beam about its supports. By positioning the bolt assemblies so that they are axially and circumferentially spaced from the corners of the segments as shown it is found that no part of the segment surface exhibits undue deflection in operation; this is due to the fact that the pneumatic forces on the segment through the cycle of operation tend to counterbalance each other about the segment support points. Selection of the actual optimum support points can be determined empirically.

In addition to preventing leakage between the chambers and into the ports, leakage of air from the cylinders to atmosphere should also be prevented as far as possible. It is for this reason that the lips 251, 252 on adjacent segments are maintained as close together as possible, and preferably the clearance d in FIG. 14 is maintained below 0.04 mm, or, where a shim is provided the clearance between the shim and each lip should not be more than that figure. The sealing rings 253 in the spaces above those lips effectively prevent radial escape of gas. Escape of gas between the axial end of the sealing segment and the respective end plate and centre plate is substantially prevented by the sealing rings 258 and 259. The final leakage path to be considered is that along the outer surface of the piston shaft, which runs with a small clearance between that surface and the end bushes 143, 146 and centre bush 145, such clearance being of the order of 0.2 mm. To reduce leakage along the piston therefore, additional sealing bushes 270, 271 and 272 are secured by bolts such as 273, 274, 275 respectively to the high pressure end bush 143, the centre bush 145 and the low pressure end bush 146 respectively. The clearance between the outer surface of the piston shaft and the inner surface of the sealing bushes is restricted to no more than 0.026 mm.

Figure 16:
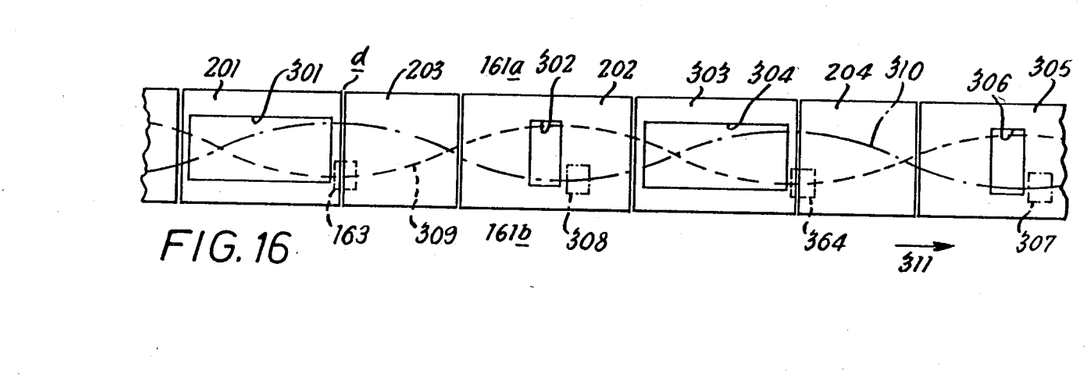
FIG. 16 is a schematic developed view of the inner surface of the cylinder showing schematically the track of the piston.

Operation of the compressor is in accordance with the principles already described, i.e. as the pistons reciprocate and rotate air is alternately induced into a chamber lying to one side of the piston, is compressed in that chamber and then exhausted from the chamber, the same actions taking place 180° out of phase in the chamber to the opposite side of the piston. Such operations occur both in the low pressure cylinder and in the high pressure cylinder with air exhausted from the low pressure cylinder being transferred by the intercooler to form the induction air to the high pressure cylinder. The operation will be further understood by reference to FIG. 16 which shows a development of the inner surface of the high pressure cylinder in the circumferential band including the intake and exhaust ports. Thus, the development shows a first intake port sealing segment 201 having an intake port 301, a first blank sealing segment 203, a first exhaust port sealing segment 202 having an exhaust port 302, a second intake port sealing segment 303 diametrically opposite to the corresponding segment 201 and having an intake port 304, a second blank sealing segment 204 diametrically opposite to segment 203 and a second exhaust port sealing segment 305 having an exhaust port 306 and lying diametrically opposite to the segment 202. The ports are spaced apart around the circumference of cylinder, and it will be seen that the ports are of equal axial extent, but the circumferential extent of the exhaust ports is less than that of the intake ports. The region marked 161a in FIG. 16 corresponds to the chamber of cylinder 161 which lies to the left of the piston 162, while the region 161b in FIG. 16 corresponds to that chamber of the cylinder which lies to the right of the piston. FIG. 16 also indicates the paths of the valving ports 163, 164 and 307, 308 in the piston 162 relative to the cylinder. The path of ports 163 and 164, both of which communicate with chamber 161a are shown in broken lines in FIG. 16 and the path of the centre of these ports during one complete revolution of the piston is indicated by the broken line 309. The corresponding valving ports 307 and 308 communicating with the chamber 161b are shown in chain lines in the Figure, and the path of the centre of these ports during one complete revolution of the piston is indicated by the chain line 310. The notional direction of travel of the piston is indicated by the arrow 311.

In the position shown in FIG. 16 the piston 162 is at the right-hand limit (as seen in FIG. 5) of its travel. Air has been induced into chamber 161a through the intake ports 301 and 304 and as the piston rotates and moves to the left that air is compressed in the chamber 161a until the leading edge of the piston ports 164, 153 reach the edges of the exhaust ports 306, 302. At that time the compressed air is exhausted, the piston commences movement to the right and after a period of decompression the leading edges of the ports 164, 163 reach the intake ports 304, 301 whereupon induction of the air into the chamber 161a commences again. Similarly, in the position shown in FIG. 16 compressed air has just been exhausted from chamber 161b and the piston ports 308, 307 are moving to the decompression part of the cycle prior to confronting the intake ports 304, 301 to induce air into the chamber 161b.

In operation of a compressor heat is generated and cooling of the apparatus is thus required. In the present case air cooling may suffice, this being assisted by the fins on the segments, by one or more paddles 276 secured to the shaft to move in the space surrounding the end bush 146 and by a similar paddle or paddles (not shown) moving in the space surrounding the end bush 143. Alternatively, the compressor may be water cooled, the whole assembly of bridge pieces and segments being surrounded by a water jacket built up from elements secured to the end plates 101, 102 and centre plate 103. In this case the paddles adjacent to end bushes 143, 146 may be retained and the space within the centre bush 145 may be cooled by water circulating therethrough by way of openings such as 277 in the centre plate 103. FIG. 4 shows the cylinders with such a jacket. If required, cooling water may also be circulated through the hollow piston shaft.

Figure 17:
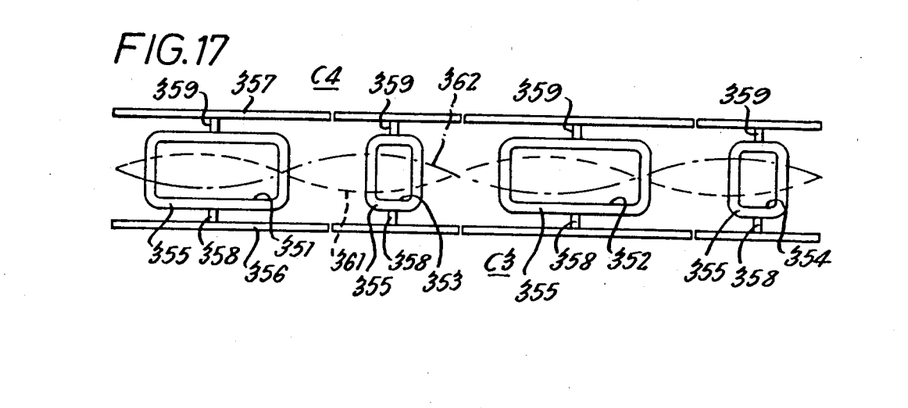
FIG. 17 is a view similar to FIG. 16 showing an alternative embodiment.

Referring now to FIG. 17 an alternative arrangement of sealing elements is shown, comprising port sealing members and a plurality of individual sealing strips. The FIG. 17 arrangement shows two intake ports 351 and 352 and two exhaust ports 353 and 354, each defined within a port sealing member 355. A ring 356 of sealing strips extends around the full circumference of the piston between the port sealing members and the chamber C3 at one side of the piston, and a similar ring 357 extends between the port sealing members and the chamber C4 at the other side of the piston. Each of the rings 356 and 357 is made up of a plurality (for example four) of sealing strips with a narrow spacing similar to the spacing d between the facing circumferential ends of adjacent strips. Further sealing strips 358 extend between each of the port sealing elements 355 and the ring 356 and further sealing elements 359 extend between the port sealing members 365 and the ring 357. The track of the centreline of valving ports in the piston communicating with chamber C3 is indicated by the broken line 361 and that of the valving port communicating with chamber C4 by the chain-line 362. It will be seen that the array of sealing elements is such that at all times a barrier is formed between direct communication between any two adjacent ports, and barriers are also formed between the chambers and the intake and outlet ports except when placed in communication by the valving ports. The mounting of a typical port sealing element 355 is shown in FIG. 18. Seen in cross-section the element comprises an arcuate plate 371 having a concave surface 372 which is spaced from the piston 373 by the required clearance a. A hollow boss 374 extends from the convex face of the plate 371 and into the opening formed in the cylinder. The actual port opening 381 is formed through the plate 371 and boss 374. The plate 371 defines a flange region 375 extending wholly around the periphery of the boss, and this flange region 375 accommodates a sealing ring 376 which effects a seal between the flange and the inner surface of the cylinder and extending completely around the boss.

The sealing member is adjustably mounted within the cylinder by two sets of adjusting elements, one to each axial side of the plate. Each set of adjusting elements includes three bolts 377 extending through a port element 382 into tapped holes in the boss 374. Two locking screws 378, each positioned between two adjacent bolts 377, pass through tapped bores in the port element 382 to bear on the radially outer surface of the boss 374. It will readily be seen that by adjustment of the bolts 377 and the locking screws 378 the sealing element may be set to provide the required clearance. The presence of the sealing rings 376 prevents leakage around the sealing elment and into the port opening.

FIG. 18 also shows one of the sealing strips 357 which extends circumferentially around the cylinder. The sealing strip 357 is received in a groove in the inner surface of the cylinder and one circumferential end thereof terminates adjacent to the sealing member 371, being spaced therefrom by a small clearance b, which is desirably of similar dimension to the clearance a. Sealing strip 357 is again adjustably mounted relative to the cylinder by a series of bolts and locking screws similar to the bolts 377 and locking screws 378 already described. Each of the other sealing strips extending circumferentially between adjacent ports is adjustably mounted in the same way as the sealing strip 357.

Figure 19:
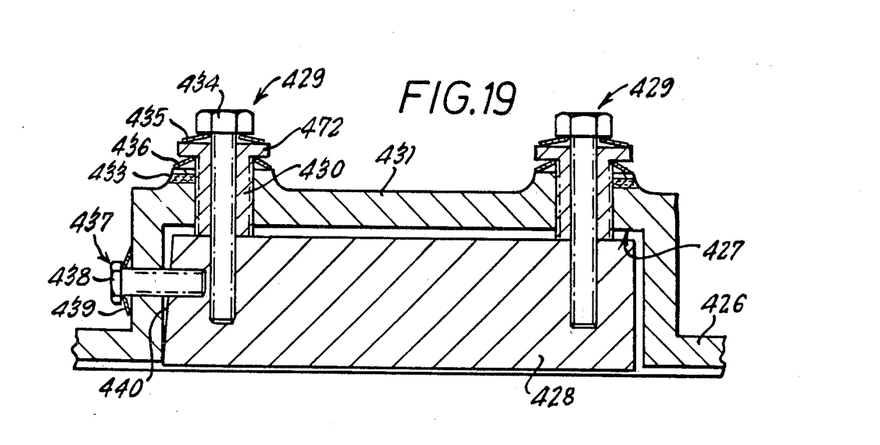
FIG. 19 is a cross-section showing a further alternative method of mounting sealing segments.

In the embodiment shown in FIG. 5 the sealing segments form the full axial extent of the respective cylinder. However, this is not essential and only part of the cylinder may be so formed. FIG. 19 shows a partial cross-section of such a cylinder. The cylinder wall 426 is recessed to form a circumferentially extending well 427 in which six segments such as 428 are arranged to lie one adjacent to another around the well. Each segment has an adjustment assembly 429 at each of its four corners, only one such assembly being shown in detail. Each assembly comprises a micrometer sleeve 430 threaded through a tapped hole in the segment 431 of the cylinder and having a head 432 by which it may be rotated to give the required setting of the segment. After adjustment the sleeve is locked by a set screw 433 and the segment held in position by a bolt 434 extending freely through the sleeve into a tapped bore in the segment. Spring washers 435 and 436 ensure positive adjustment without error due to backlash on the respective threads.

Each segment has two further adjustment assemblies such as 437 located on one axial side only of the segment. Each such assembly comprises a bolt 438 and spring washer 439, the bolt engaging a tapped bore in the segment. By tightening the bolt the segment is pulled towards one axial end of the well to seal with a tapered side 440 against the edge of the well. A soft packing member may be incorporated in this portion if required.

In this arrangement the required limited clearance is present between the individual segments and the piston, with the clearance between the piston and the main body 426 of the cylinder being greater. Two of the segments 428 have exhaust ports therethrough and a further two have inlet ports therethrough. The segments abut circumferentially to form a central band of limited clearance around the piston.

The sealing arrangements that have been described in detail are dependent for their effect on setting a spacing such that air leakage is reduced to an acceptable, very low, level. Somewhat larger clearances could be obtained by injecting oil from passages in the sealing elements into the clearance between those elements and the confronting surface, the pressure of the oil being greater than the maximum expected gas pressure. Any of the embodiments described may be modified to act in this manner. For example, in the FIG. 17 embodiment the members 355 to 359 shown as sealing elements on strips could be looked upon as oil supply channels in a solid member secured to the cylinder, the channels opening towards the piston. Means would be incorporated to supply the oil under pressure, to effect the required sealing.

It will be appreciated that other arrangements of sealing elements may be designed to achieve the required effect. The mountings for the sealing elements may be varied from those described and it will also be understood that the piston and cylinder arrangement may differ from that specifically shown in FIG. 5.

The sealing segments or sealing strips may be made from any one of a number of materials, as long as the resultant sealing element is capable of holding its shape. For example hard metal or compacted graphite may be used. In one form the element may be of metal with a plastics lining on that surface which confronts the piston, to reduce damage should fouling occur.

Although the invention has been illustrated in the context of a two-stage compressor it will be appreciated that sealing means as described may be applied to a single-stage compressor having a single cylinder with a piston mounted for rotation and reciprocation therein. It is equally applicable to a blower having a plurality of axially adjacent cylinders, in each of which is a piston, the pistons for all cylinders being carried for rotation and reciprocation by a common shaft. Each cylinder acts as a single-stage blower and the air from all cylinders may be led to a common outlet to give a machine capable of delivering very high volumes of air. Such a two-stage machine will be similar in construction to that shown in FIG. 5, but with the pistons and cylinders generally being each of equal dimensions. A machine having more than two stages will again be similar, with additional cylinders constructed in the same way and with the piston shaft extended and carrying additional cylinders. Furthermore, the invention is applicable to compressors wherein the piston only reciprocates, and is not capable of rotation.

I claim:

1. A gas compressor or blower comprising cylinder means; piston means rotatably and reciprocably mounted in the cylinder means; ports spaced around the circumference of the piston means for cooperating with the ports spaced around the circumference of the cylinder means to admit gas into and exhaust gas from at least one chamber lying to one side of the piston means; a piston shaft to which the piston means is secured, the piston shaft passing through seals at the axial ends of the cylinder means; and means for driving the piston shaft to rotate and reciprocate relative to the cylinder means, the arrangement of ports being such that as the piston rotates and reciprocates gas is induced into the chamber, is compressed in the chamber and then exhausted from the chamber; characterised in that each of the ports on a first one of the piston and cylinder means has associated sealing means forming a continuous barrier around the periphery of the associated port and mounted to confront the second one of the piston and cylinder means with a clearance between the sealing means and the confronting surface sufficiently low to limit leakage to or from the respective port both axially and circumferentially of the piston when that port is fully confronted by the piston.

2. A gas compressor or blower according to claim 1 characterised by sealing means on said first one of said piston and cylinder means and confronting the surface of said second one of those means, the sealing means forming a continuous barrier around the circumference of the piston with the clearance between the sealing means and the confronting surface being sufficiently low to limit axial leakage between the piston and cylinder means.

3. A gas compressor or blower according to claim 1 characterised in that the clearance between each sealing means and the confronting surface is in the range of from 0.008 to 0.1 mm.

4. A gas compressor or blower according to claim 3 wherein the clearance between any part of the inner surface region of each sealing means and the confronting part of the piston surface is a range of between 0.015 and 0.019 mm.

5. A gas compressor or blower according to claim 1 characterised in that each sealing means has been adjusted relative to support means to be set at the required clearance from the confronting surface independently of the other sealing means.

6. A gas compressor or blower according to claim 5 characterised in that the cylinder means comprises two axially spaced end members, a plurality of sealing segments having inner surface regions constituting the sealing means; the segments extending between the end members and circumferentially adjoining one another to form a closed, substantially cylindrical inner surface, two of the segments each having an inlet port formed through its radial thickness and opening into its inner surface region, two other of the segments each having an outlet port formed through its radial thickness and opening into its inner surface region, and each segment being mounted on the end members so that it can be radially adjusted independently of the other segments.

7. A gas compressor or blower according to claim 6 characterised in that each sealing segment has an internal radius of curvature different from the external radius of curvature of the piston.

8. A gas compressor or blower according to claim 7 wherein the internal radius of curvature of each sealing segment is greater than the external radius of curvature of the piston.

9. A gas compressor or blower according to claim 7 characterised in that each sealing segment has an angular extent of no more than 90°, and the difference between said radii of curvature is not more than 0.05%.

10. A gas compressor or blower according to claim 9 wherein the sealing segment has an angular extent of not more than 70°.

11. A gas compressor or blower according to claim 1 characterised in that there is provided a continuous cylinder, and each sealing means is mounted adjustably on the cylinder to protrude inwardly from the radially inner surface thereof.

12. A gas compressor or blower according to claim 11 characterised in that each sealing means is adjustably mounted by way of a series of bolts capable of cooperating with the sealing means to move this radially inwardly and outwardly of the cylinder, the bolts and the locking means being alternately arranged circumferentially of the cylinder.

13. A gas compressor or blower according to claim 11 in which at least some of said sealing means are sealing strips.

14. A gas compressor or blower according to claim 11 wherein the clearance between any part of the inner surface of each sealing means and the confronting part of the piston surface is a range of between 0.015 and 0.019 mm.

* * * * *